No. 869,584. PATENTED OCT. 29, 1907.
N. P. MADER.
BELT FASTENER.
APPLICATION FILED MAY 11, 1906.
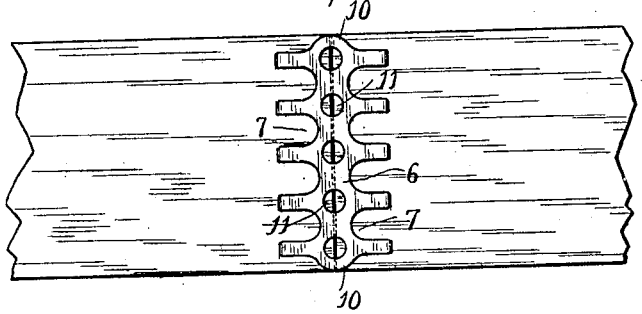
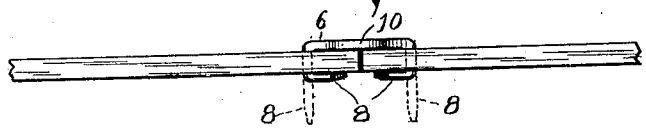
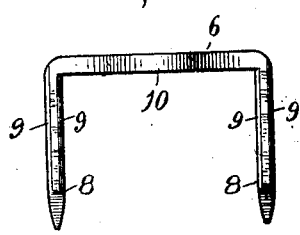
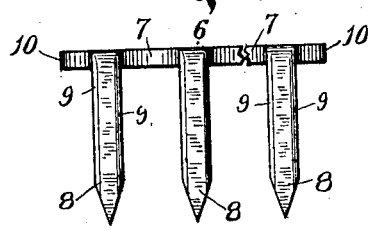
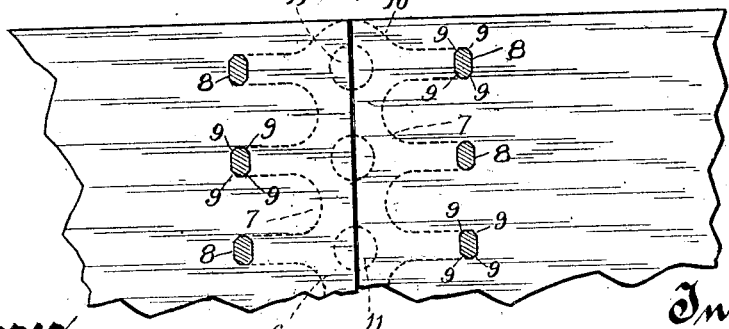
Witnesses. Inventor.
Nicholas P. Mader
By Benedict, Morsell & Caldwell
Attorneys.

UNITED STATES PATENT OFFICE.

NICHOLAS P. MADER, OF SUN PRAIRIE, WISCONSIN.

BELT-FASTENER.

No. 869,584.  Specification of Letters Patent.  Patented Oct. 29, 1907.

Application filed May 11, 1906. Serial No. 316,235.

*To all whom it may concern:*

Be it known that I, NICHOLAS P. MADER, whose residence and post-office address is Sun Prairie, in the county of Dane and State of Wisconsin, have invented new and useful Improvements in Belt-Fasteners, of which the following is a description, reference being had to the accompanying drawings, which are a part of this specification.

My invention has relation to improvements in belt fasteners.

An important object of the invention is to provide a construction of belt fastener, capable of firmly uniting the belt ends, and which at the same time will prevent, to a very great extent, the liability of the teeth tearing the belt.

A further object resides in providing a construction wherein the side edges of the united belt ends are protected from wearing or tearing.

A further object is to provide a belt fastener of such construction as to provide the requisite amount of strength, and yet at the same time possess the required degree of flexibility.

With the above, and other incidental, objects in view, the invention consists of the devices and parts, or their equivalents, as hereinafter set forth.

In the accompanying drawing, Figure 1 is a plan view of the device applied to a belt to connect the meeting ends of said belt; Fig. 2 is an edge view of Fig. 1, showing the teeth in dotted lines before being bent against the under side of the belt ends, and in full lines the teeth as bent against the belt ends; Fig. 3 is an end view of the fastener; Fig. 4 is a side view of the fastener, the body portion thereof being partly broken away and some of the teeth removed;
and Fig. 5 is an inverted plan view of the device applied to the meeting ends of a belt, the teeth being in transverse section.

Referring to the drawing, the numeral 6 indicates the main top or body portion of the fastener, constructed of steel, or other suitable metal, and preferably stamped out and pressed into shape. This main body portion of the fastener is formed at opposite edges with oppositely disposed inwardly extending recesses 7, thereby leaving a central portion of diminished width adapted to extend transversely over the belt at the meeting ends thereof, and opposite lateral projections portions of which are bent downwardly at right angles, that is, between the ends of the projections and the bottoms of the recesses, to form downwardly extending teeth 8. The lower ends of these teeth are pointed, as clearly shown in the drawings, and the four corners of the teeth, which are originally square corners, are chamfered or cut away, as indicated by the numeral 9. In this manner, the four
sharp corners or angles which would otherwise be left are eliminated, so that the tendency which said corners would have to tear the belt, owing to the longitudinal pull or strain on the belt, with consequent lateral separating of the belt, is avoided. Again, by this construction, wide surfaces are formed on the fore and aft sides of the teeth, as most clearly shown in Fig. 5, thus further obviating the tendency to tear the belt which exists in belt fasteners wherein the fore and aft sides are of diminished widths, or are more or less pointed, such constructions, of course, continually presenting a bearing against one point of the belt, and consequent concentration of the bearing at this particular point, instead of being distributed over a wider area, as in my improved construction. The chamfers 9 at the corners of the teeth preferably commence at a point just below the bend of the teeth, and terminate where the teeth begin to taper to a point. Furthermore, the teeth are preferably of the same size from the bend to where they begin to taper. By starting the chamfers just below the bend, the metal is left of full width and strength at the bend and hence strength is subserved at the weakest point and where the greatest strain occurs.

It will be seen that the opposite ends of the main top portion of the fastener are extended out laterally in rounded projections 10, the said projections extending far enough to lie flush with the side edges of the belt at the point of meeting of the belt ends. By this arrangement, the side edges of the belt are protected from being torn or worn, which is especially liable to happen when belt shifters are employed, because in many cases where no protection is provided the shifters catch in the joint and tear the belt.

The body portion 6 of the fastener is provided with a series of openings 11, arranged a desired distance apart, and in the longitudinal line of said body portion. By providing these openings, especially in connection with the recesses 7, the maximum degree of flexibility of the fastener is secured, thus adding to the life time of the fastener, especially when running around small pulleys, and at the same time the weight of the fastener is considerably reduced.

It will be further noted that my construction is such that the end teeth of the fastener are sufficiently removed from the edges of the belt to prevent tearing outwardly of the belt.

It will be understood that before the device is applied to a belt, the teeth 8 extend downwardly, as shown in Figs. 3 and 4. In adjusting the device, the body portion is placed above the meeting ends of the belt, and the teeth forced through the leather of the respective ends of the belt in the manner shown by dotted lines in Fig. 2. The ends of the teeth which project below the under side of the belt are now bent upwardly and clenched to the belt, as shown by full line in Fig. 2.

What I claim as my invention is;

A belt fastener, consisting of a main body portion adapted to be placed over the meeting ends of a belt, and teeth with parallel sides bent downwardly from the opposite side edges of said main body portion, and adapted to be forced through the adjacent ends of the belt and to be turned towards each other and up against the under side of the belt ends, the lower ends of the teeth being pointed, and the corners of the teeth being chamfered, the chamfered portions commencing at a point just below the bend of the teeth and extending to points where the teeth begin to taper, and each tooth being of substantially the same width from the point where the chamfering commences to the point where the tooth begins to taper.

In testimony whereof, I affix my signature, in presence of two witnesses.

NICHOLAS P. MADER.

Witnesses:
J. M. BATZ,
FRED E. MAGDEBURG.